June 29, 1926.  
E. H. MARSH, JR  
APPARATUS FOR USE IN INSPECTING TIRES  
Filed April 23, 1924 4 Sheets-Sheet 1
1,590,639
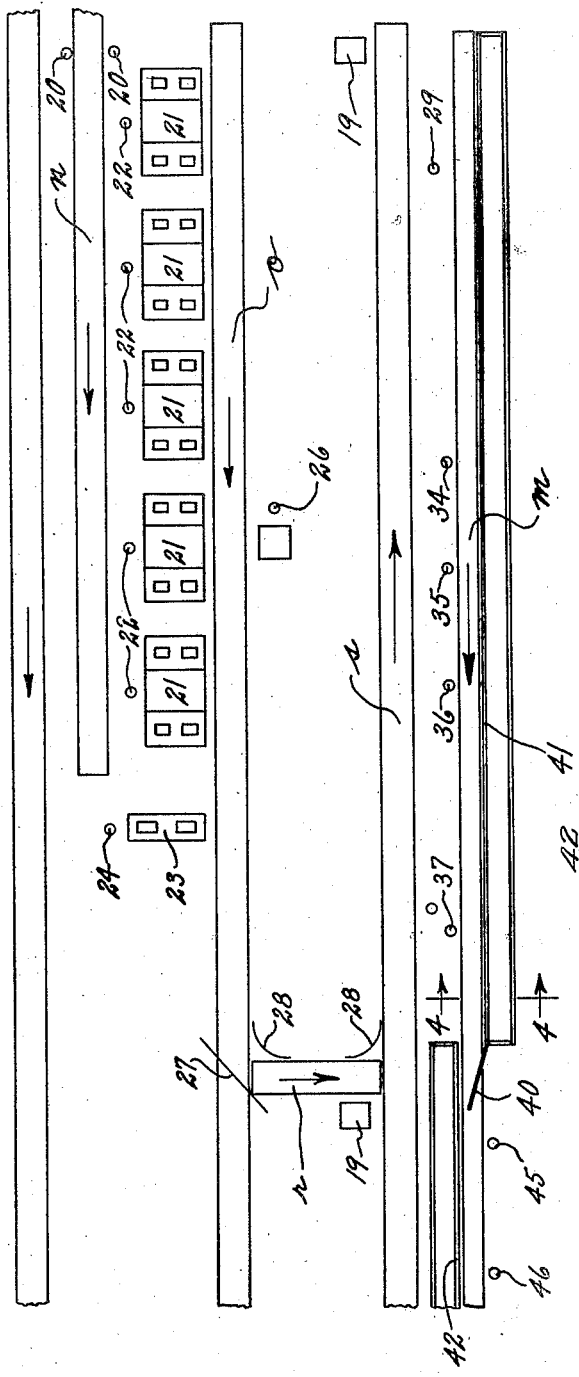
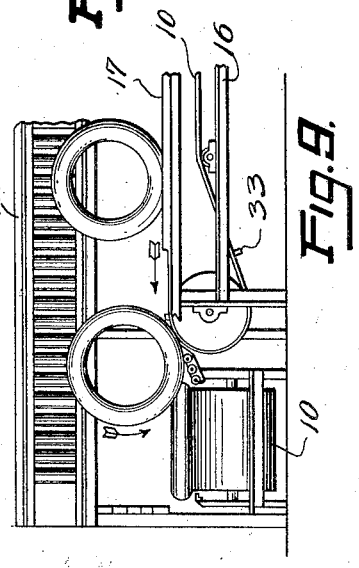
INVENTOR.  
Edward H. Marsh, Jr.  
BY  
Edward V. Taylor  
ATTORNEY.

June 29, 1926.

E. H. MARSH, JR 1,590,639

APPARATUS FOR USE IN INSPECTING TIRES

Filed April 23, 1924    4 Sheets-Sheet 2

INVENTOR.
Edward H. Marsh, Jr.
BY
Edward Taylor
ATTORNEY.

June 29, 1926.
E. H. MARSH, JR
1,590,639
APPARATUS FOR USE IN INSPECTING TIRES
Filed April 23, 1924    4 Sheets-Sheet 3
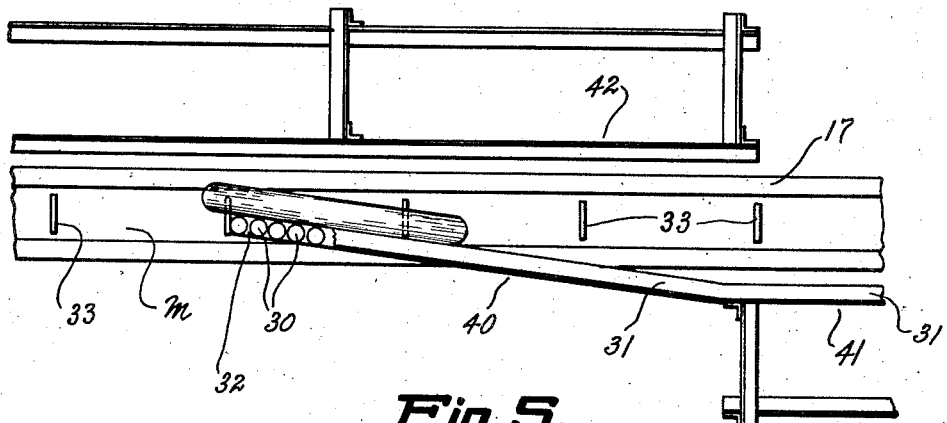
Fig. 5.
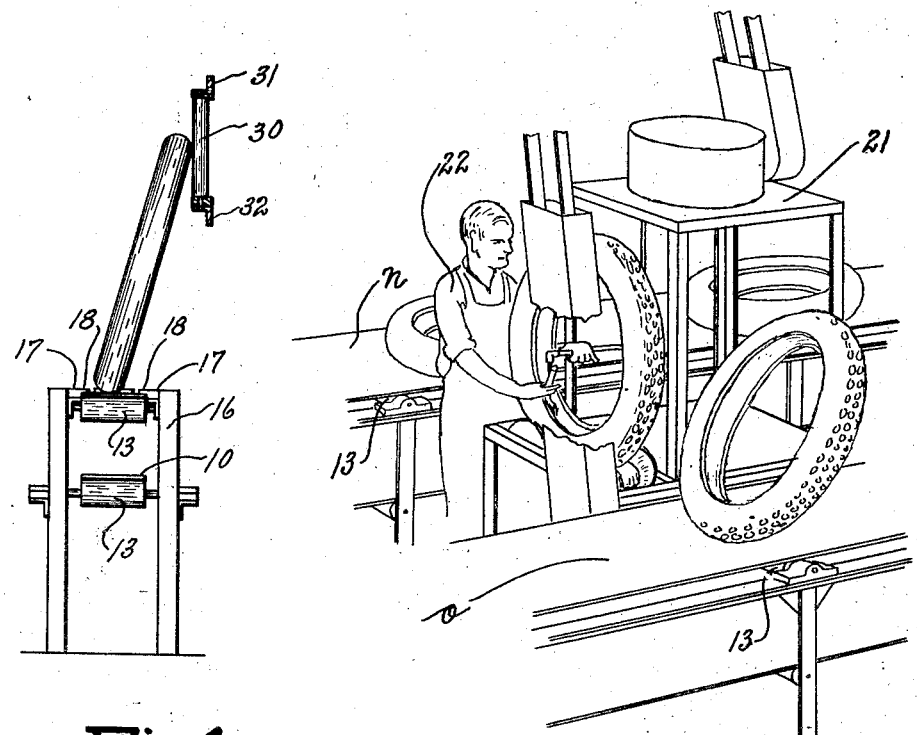
Fig. 4.
Fig. 6.
INVENTOR
Edward H. Marsh, Jr.
BY Edward C. Taylor
ATTORNEY June 29, 1926.

E. H. MARSH, JR 1,590,639

APPARATUS FOR USE IN INSPECTING TIRES

Filed April 23, 1924     4 Sheets-Sheet 4

INVENTOR.
Edward H. Marsh, Jr.
BY
Edward C. Taylor
ATTORNEY.

Patented June 29, 1926.

1,590,639

UNITED STATES PATENT OFFICE.

EDWARD H. MARSH, JR., OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR USE IN INSPECTING TIRES.

Application filed April 23, 1924. Serial No. 708,477.

This invention relates to an apparatus for use in the manufacture of automobile tires. It has for its object the provision of an apparatus which is an improvement in the handling of tires in the inspecting, stenciling, and wrapping operations. A further object of this invention is to provide an apparatus of this character wherein a continuous line of tire casings, after passing through the first side inspection, may be automatically tipped into a position so the second side may be inspected. A still further object of the invention is to provide means for automatically tipping tire casings from a slanting position on one conveyor to a horizontal position on a second conveyor. The particulars in economy, speed, and reliablility with which the tires may be handled, and various other features of the invention, will be described in the following description and claims.

Fig. 1 is a partial diagrammatic plan of the apparatus used in carrying out certain features of the invention;

Fig. 4 is a section taken on line 4—4 of Fig. 1;

Fig. 5 is a plan view of the means used in tipping the tires from one side to the other to permit the inspection of both sides, and also showing a tire which has traveled part way through the tipping apparatus;

Fig. 6 is a perspective showing the painting of the inside of a tire;

Fig. 9 is a view similar to Fig. 7 but showing a slight modification in the construction.

Figure 2:
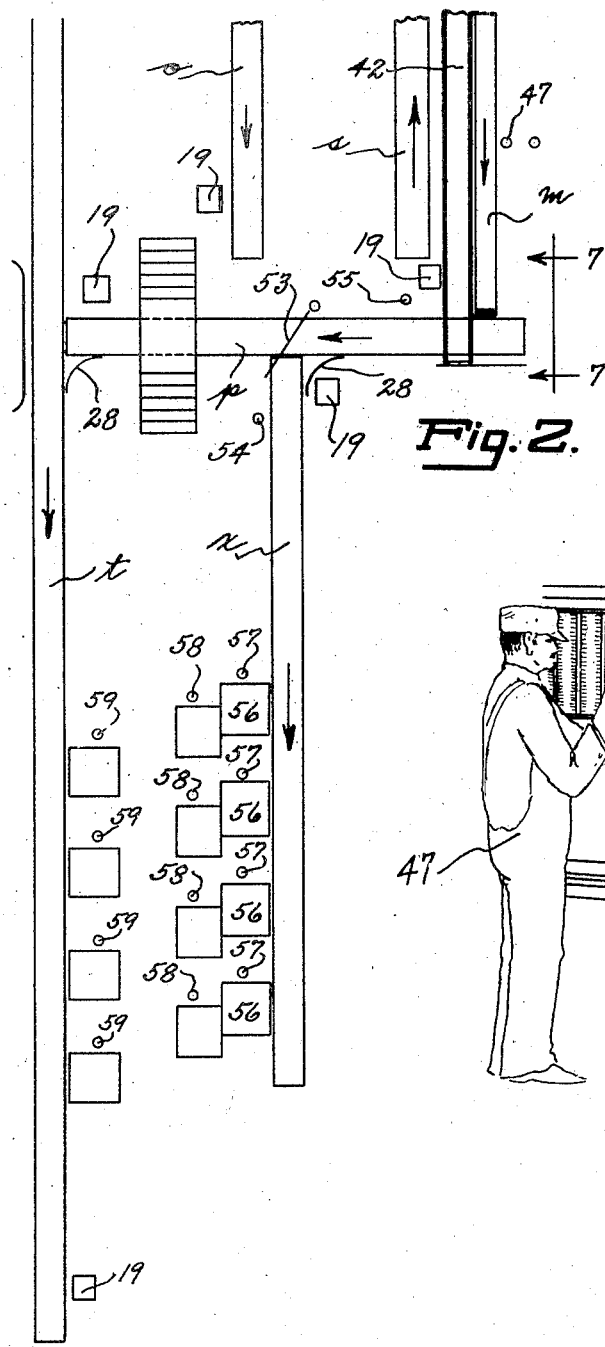
Fig. 2 is a partial diagrammatic plan showing that part of the apparatus not shown in Fig. 1.

The invention consists in the construction and combination of parts shown in the drawings and hereinafter described and pointed out in the appended claims.

The conveyors used in the conveyor system shown in Figs. 1 and 2 are preferably constructed of belts 10 passing over pulleys 11 (Figs. 7 and 8), located at the ends of the conveyors and supported at intermediate points by the rolls 13 (Figs. 4, 6, 7, and 8). The rolls 13 are arranged near enough together to prevent sagging of the conveyor belts. The frame 16 on which the pulleys 11 and supporting rolls 13 of the conveyor $m$ (Figs. 1, 2, and 4) are mounted also supports side guards 17. Portions 18 (Fig. 4) of the side guards 17 project over the edges of the belt of the conveyor $m$ to prevent the tires from sliding off the conveyor belt. The driving mechanism for the conveyors, represented by the square 19, may consist of successive pairs of gears transmitting motion from the motor to the shaft which supports the pulley to be driven, or of some other suitable means of transmitting motion.

The tires are placed on the conveyor $n$ as they come from the heaters, so that at times a continuous line of tires are passing through the various inspecting operations.

The tread portion of the tires is inspected by the tread inspectors 20. The inside of the tires are painted by the painting machines 21 and as fast as the tires are painted they are pushed out of the painting machines onto the conveyor $o$ by the painting machine operators 22 (Fig. 6). As the tires pass operator 26 he trims the beads of the tires that need trimming.

Tires that have been rejected because of dirty sidewalls are cleaned in the cleaning machine 23 by the operator 24 and placed on conveyor $o$. Over conveyor $o$ is the gate 27 which pushes the tires onto the cross conveyor $r$ that carries the tires across to the conveyor $s$ which travels in the opposite direction to conveyor $o$. Where the tires are transferred from one conveyor to another, as from conveyor $o$ to conveyor $r$ or from conveyor $r$ to conveyor $s$, a guide 28 is used to position the tires on the conveyor to which the tires are being transferred.

Figure 3:
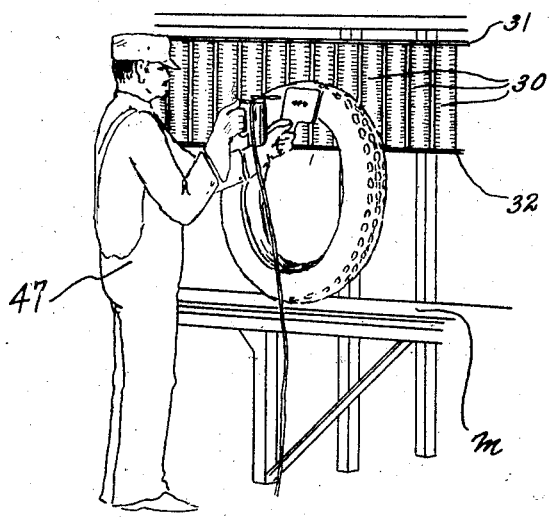
Fig. 3 is a perspective showing the stenciling of a tire.
Figure 7:
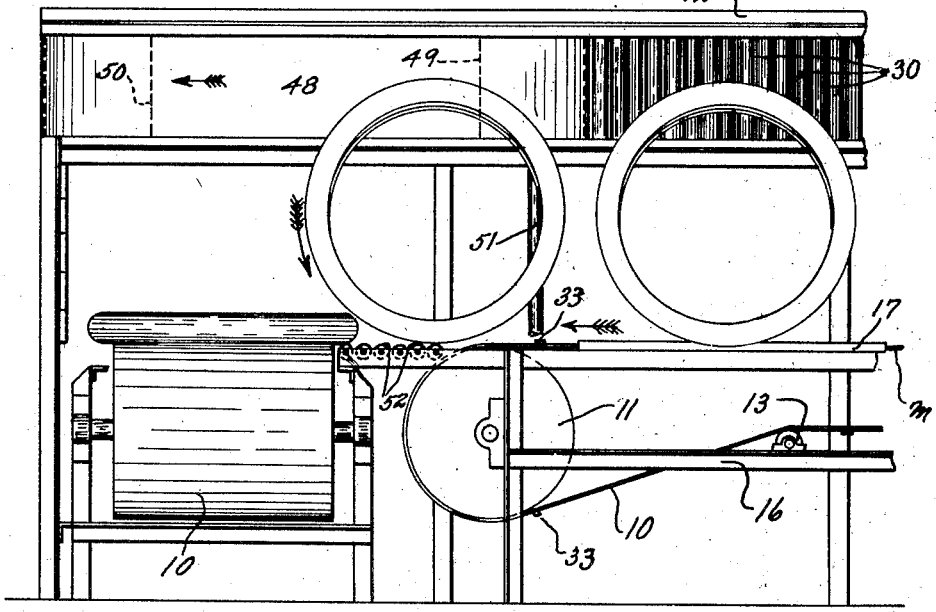
Fig. 7 is a partial side view of the inspection conveyor.

As the tires reach the end of conveyor $s$ the operator 29 transfers the tires to the conveyor $m$. Operator 29 places the tires on the conveyor $m$ so that they lean against the vertical rolls 30 mounted between the supporting members 31 and 32 (Figs. 3 and 4). The rolls 30 may be mounted on roller bearings to permit them to rotate freely. On the belt of the conveyor $m$ are cleats 33 (Fig. 5) to prevent the tires from rolling backwards due to any dragging or pulling that the rolls 30 or guards 17 may have on the tires.

The placing of the tires in a slanting or leaning position (Fig. 4) on conveyor m permits them to be readily inspected as they pass through the various inspection operations. The sidewalls are inspected as they pass operator 34, the beads of the tire are inspected as they pass operator 35, and the sidewalls and beads are re-inspected by operator 36 and placed in position so the trademarks can be stenciled as they pass operator 37. This completes the inspection of one side of the tire. On completing the inspection on one side of the tires they are tipped into position by the tipping device 40 so the opposite side of the tires may be inspected. The tipping apparatus 40 preferably is of similar construction to the upper portion of the conveyor (Fig. 5). It is positioned so as to partly close the space between the upper sections 41 and 42, extending diagonally over the conveyor belt 10 at approximately the same height as the upper section 41. The tipping apparatus consists of the rolls 30 supported between the supporting members 31 and 32 which are preferably the same as those shown in Figs. 4 and 7, although they may consist of a belt similar to belt 48 made to travel in the same direction as the tires are traveling and extending diagonally over the conveyor belt.

Figure 8:
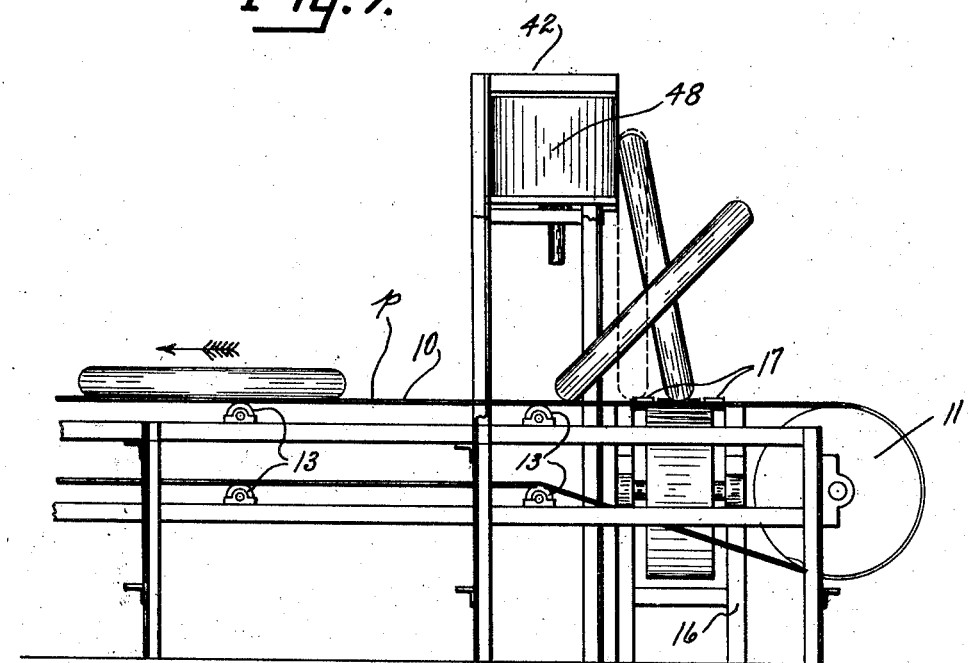
Fig. 8 is a view taken from the left of Fig. 7.

As the portions of the tires which are in contact with rolls 30 of the conveyor m come in contact with the rolls of the tipping apparatus the tires are tipped first into a vertical position (Fig. 5), and as they are carried on by the conveyor m they are tipped from the vertical into a position similar to the one shown in Fig. 8. This is due to the rolls of the tipping apparatus projecting over the conveyor far enough to cause the tires to be tipped from a leaning position against the supporting means 41 to an upright position, and then by still further tipping action of the apparatus 40 the tires are tipped over far enough to allow gravity to carry them over against the rolls 30 of the supporting means 42, where the tires are now in position to have the opposite sides inspected.

The tires are transferred from conveyor m onto a conveyor p which is at right angles to conveyor m. For the purpose of rotating the tires in the transfer a belt 48 is preferably substituted for the rolls 30 of the supporting means 42 after the tires pass the operator 47. As the tires pass operators 45 and 46 the sidewalls and beads are inspected, and if necessary they position the tires for the stenciling which is done by operator 47 (Fig. 3).

The belt 48 passes over pulleys 49 and 50 with pulley 49 on the shaft 51 which may be driven by any suitable means. Instead of being entirely carried along by the belt of conveyor m and sliding over the rolls 30 of the supporting means 42, the tires will turn or roll in the direction indicated in Fig. 7 because the belt 48 is traveling in the same direction and at a higher rate of speed than the belt of the conveyor m. If the belt 48 is traveling at the same speed as the tires on the belt of conveyor m they will not turn or rotate until they have left the belt of the conveyor and are on the rolls 52 which bridge the space between conveyor m and conveyor p.

When a tire leaves the belt of conveyor m it rolls over the rolls 52 onto conveyor p. As the tire rolls onto the belt of conveyor p it will be carried in the direction of the arrow (Fig. 8), and at the same time continue to roll until it has reached about the middle of the conveyor belt, and by this time the bottom of the tire has been carried under the belt 48 far enough to stop the tire from being rotated by the belt. The tire stops rotating when it has been brought into a vertical position or a little past the vertical, for the tire has then moved away from the belt 48. As the tire is carried on by the belt of the conveyor p it will tip over onto the belt of the conveyor p (Fig. 8). The tire may also be rolled onto conveyor p by rolling it down an inclined plane.

All tires which are not to be wrapped pass under the gate 53 and onto the conveyor t. Any tires to be wrapped are pushed off conveyor p onto conveyor x by dropping the gate 53. As the tires pass operators 54 and 55 the flaps and stickers are placed inside the tires. The tires are wrapped in the wrapping machines 56 by the operators 57 and 58. The tires are tied in bundles by operators 59 and placed on conveyor t which carries them to the shipping room with the unwrapped tires.

Having thus described my invention, I claim:

1. In an apparatus of the class described, two conveyors at right angles to each other, means adjacent one conveyor for supporting annular articles in a slanting position, said supporting means extending beyond said conveyor over the second conveyor, and means for rolling the articles onto the second conveyor.

2. In an apparatus of the class described, two conveyors at right angles to each other, means adjacent one conveyor for supporting annular articles in a slanting position, said supporting means extending beyond the conveyor over the second conveyor, and means for moving the articles onto the second conveyor whereby the articles are tipped into a horizontal position on the second conveyor.

3. In an apparatus of the class described, two conveyors substantially at right angles to each other, means adjacent one conveyor for supporting annular articles in a slanting position, said supporting means extending beyond said conveyor over the second conveyor, means provided for rolling the articles onto the second conveyor by said supporting means, and the second conveyor and said supporting means acting together to tip over the article into a horizontal position on the second conveyor.

4. In an apparatus of the class described, a conveyor for supporting an annular article in a slanting position, and means for automatically reversing the slant of said article at a predetermined point in the travel of the conveyor.

5. In an apparatus of the class described, a conveyor for handling articles, means for supporting the articles on the conveyor in a slanting position on one side, means for automatically reversing the slant, and means for supporting said articles in a slanting position on the opposite side of the conveyor.

6. In an apparatus of the class described, a conveyor means for supporting an article when tilted to one side, means for supporting the article when tilted to the opposite side of the conveyor, and means for automatically tilting said article from one supporting means to the other.

7. In an apparatus of the class described, a conveyor, means adjacent said conveyor for supporting annular articles in a slanting position, means whereby said articles pivot upon the conveyor and are moved transversely from supporting means on one side of the conveyor to the supporting means on the opposite side of the conveyor into a slanting position.

EDWARD H. MARSH, Jr.